UNITED STATES PATENT OFFICE 2,195,570

KETONIC ACID-AMINE RESINS AND PROCESS OF MAKING SAME

Almon G. Hovey, Pleasant Ridge, and Theodore S. Hodgins, Royal Oak, Mich., assignors to Reichhold Chemicals, Inc., formerly Beck, Koller & Company, Inc., Detroit, Mich.

No Drawing. Application November 10, 1938, Serial No. 239,879

4 Claims. (Cl. 260—65)

The invention relates to ketonic acid-amine resinous condensation products and the process of making the same. The present application is a continuation-in-part of our prior application Serial No. 188,392 filed February 2, 1938 (now Patent No. 2,149,678 dated March 7, 1939) which in turn is a continuation-in-part of an earlier application Serial No. 147,569 filed June 10, 1937 (now Patent No. 2,153,801 dated April 11, 1939).

The claims of the present application are directed specifically to the use of laevulinic acid and an organic amine and the fusing together of these components has been found to result in a particularly useful resinous product.

There are a large number of patents on urea condensation products but practically all of them cover tedious delicate processes requiring very careful control of such conditions as pH and temperature. The ingredients must be carefully reacted in a certain prescribed order and very specific directions followed or else the product is likely to go over to a useless white insoluble precipitate, or else to a gel. Most of these patents covering urea resins are intended for moulding purposes. The preparation of surface coating resins from urea is much more difficult than the preparation of moulding compositions. Surface coating resins must be miscible with the commonly used paint, varnish and lacquer ingredients, and require skill not given in any publication heretofore. Furthermore, in the manufacture of urea resins it has not been possible to make products which are as easy to cook or as foolproof in manufacturing as the alkyd resins. It has not been possible to make resins by fusing urea or other amines with other reactive ingredients at relatively high temperatures because gelation inevitably takes place at too rapid a rate even for a rough control.

A fusion method would be highly desirable because it would avoid the tendency towards precipitation when an aqueous formaldehyde solution is used and it would avoid dangerous formation of steam should the reaction "run away." Furthermore, the fusion method would allow the use of higher temperatures similar to those used in alkyd resin formation and with a much better chance of obtaining resinification than if the reaction were carried on in an aqueous solution.

We have found how to make resins by such a fusion process, and we have found that not only urea may be used, but a large variety of amines, including mono-amines, which hithertofore have been regarded as inoperative or unsuitable for any type of resin formation. Mono-amines and other amines may have been suggested as modifying agents for resins, but have never been considered as the basic resin-forming ingredients. In our process, no control of pH is necessary, the resinification taking place under as orderly conditions as in the case of the alkyd resins, instead of requiring the meticulous control of artificial conditions which is necessary in the case of the urea-formaldehyde processes which have been hithertofore described. It is not necessary that a solvent or dispersing medium be present; our operations consist only of fusing the ingredients, i. e., the acid and amine. Thus, the apparatus required for carrying out our process is less complicated and less expensive. The obvious simplicity of our process makes it especially desirable. The increasing availability and potential low cost of producing many amines makes our process even more desirable.

These resins are formed when various organic acids are reacted with urea, isobutyl amine or with several other amines, as shown by the general reaction:

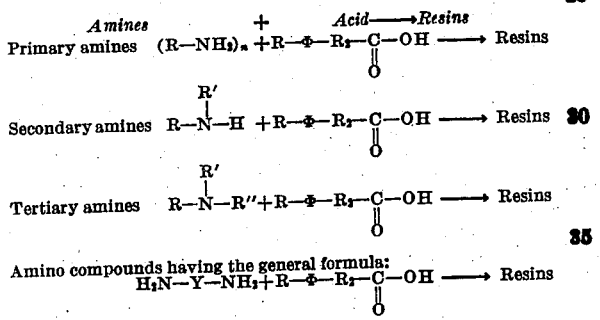

where

R, R', R''=alkyl or aryl groups.
Y=a group such as $-C-$, $-C-$, $-C_nH_n-$ etc.
       $\overset{\|}{O}$  $\overset{\|}{S}$ $n \geq 1$ $R_1$=segment of hydrocarbon structure (alkylene or arylene), e. g., $-CH_2-$, $-C_2H_4-$, $-C_6H_4-$ etc.

$\Phi$=any functional group, such as $-\overset{|}{C}=O$, $H\overset{|}{C}=O$,

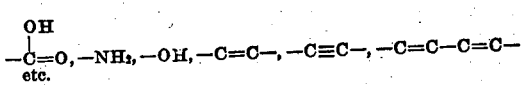

These reactions fall into four general classes based on the variation of the acidic component with the assumption that amines are operative equivalents, i. e., that the trivalent nitrogen becomes pentavalent.

1. Ketonic acid+amine→"Ketacine" resins
2. Unsaturate acid+amine→"Unacine" resins
3. Dibasic acid+amine→"Dibacine" resins
4. Hydroxy acid+amine→"Hydracine" resins These resins which we are describing are not to be confused with the resins such as are described in Weisberg and Greenwald U. S. Patent No. 1,918,222, in which a resin which is essentially an alkyd resin is disclosed which is obtained by fusing phthalic anhydride with triethanolamine. In this case the triethanolamine is simply described as another polyhydric body which might be used as a substitute for glycerol, a trihydric alcohol. Triethanolamine and phthalic anhydride should form a resin in exactly the same way and according to the same principle as does glycerol and phthalic anhydride as described by Kienle and Hovey (Journal of The American Chemical Society, volume 501, page 512, (1929)). We have found that amines without any hydroxyl groups form resins with the organic acids of the generic formula R—Φ—R₂—COOH (as mentioned previously), this being an entirely unexpected result which is entirely outside the classification of alkyd resins, the definition of an alkyd resin by Kienle and Ferguson being a "product of polybasic acids and polyhydric alcohols" (Industrial and Engineering Chemistry, volume 21, pages 349-52, (1929)).

This application is one of a series in which resins made from amine and various types of organic acids are described. The present application concerns itself with the resins formed from amine and ketonic acid. These new and useful resins are formed by simple fusion without the necessity of using catalysts and without the necessity of carrying out the reactions in solvent or in the presence of a fluxing medium of any sort, and without the necessity of controlling pH. For the sake of simplicity, these resins formed from ketonic acid and amine have been contracted to the term "Ketacine" resins, and hereafter in this application shall be termed "Ketacine" resins.

The ketonic acids which form "Ketacine" resins with amines according to our invention come under the classification of the following general formula:

R.CO.R'.COOH where R=an alkyl or aryl group
and R'=an alkylene or arylene group (carbon atom length may be 0 to n)

Specific examples of this general formula are:

Pyruvic acid, CH₃.CO.COOH
Aceto-acetic acid, CH₃.CO.CH₂.COOH
Benzoylbenzoic acid, C₆H₅.CO.C₆H₄.COOH
Benzophenone-dicarboxylic acid,
C₆H₅.CO.C₆H₃.(COOH)₂
Benzoyl acrylic acid, C₆H₅.CO.CH:CH.COOH
Paramethylisopropylorthobenzoylbenzoic acid,

C₆H₃(CH₃)(C₃H₇).CO.C₆H₄.COOH

The following table giving many general examples of how various types of resins may be prepared according to our invention by fusing ketonic acids with amines, permits one to gain some idea of the breadth of the Ketacine family of resins together with some idea of their importance:

GENERAL EXAMPLES

Table I

I Pyruvic acid+urea——→Red-orange resin
Pyruvic acid+isobutyl amine——→Yellow-orange resin
Pyruvic acid+aniline——→Yellow-orange resin
Pyruvic acid+hexamethylene tetramine——→Red-orange resin
Pyruvic acid+formamide——→Red-orange resin
Pyruvic acid+succinimide——→Yellow-orange resin
Pyruvic acid+thiourea——→Black resin II Aceto-acetic acid}+urea——→Yellow resin III Benzoylbenzoic acid}+urea——→Yellow resin
Benzoylbenzoic acid}+isobutylamine——→Light straw colored resin
Benzoylbenzoic acid}+acetamide——→Green resin
Benzoylbenzoic acid}+aniline——→Yellow-orange resin
Benzoylbenzoic acid}+hexamethylene tetramine——→Dark brown resin
Benzoylbenzoic acid}+formamide——→Green resin
Benzoylbenzoic acid}+succinimide——→Brown resin
Benzoylbenzoic acid}+thiourea——→Brown resin
Benzoylbenzoic acid}+monoamylamine——→Water-white resin
Benzoylbenzoic acid}+diamylamine——→Brown resin
Benzoylbenzoic acid}+triamylamine——→Yellow resin
Benzoylbenzoic acid}+monomethylamine——→Water-white resin
Benzoylbenzoic acid}+dimethylamine——→Water-white resin
Benzoylbenzoic acid}+trimethylamine——→Water-white resin
Benzoylbenzoic acid}+pyridine——→Water-white resin
Benzoylbenzoic acid}+dimethylaniline——→Water-white, sticky balsam resin IV Paramethylisopropylorthobenzoylbenzoic acid}+urea——→Light straw colored resin V Benzoylacrylic acid}+urea——→Reddish-brown resin
Benzoylacrylic acid}+isobutylamine——→Orange balsam resin
Benzoylacrylic acid}+aniline——→Yellow-orange resin VI Benzophenonedicarboxylic acid}+urea——→Water-white resin
Benzophenonedicarboxylic acid}+isobutylamine——→Red resin The following are specific examples of how "Ketacine" resins may be prepared according to our invention:

Example I

One mol of urea is reacted with one mol of benzoylbenzoic acid at 150° C. The ingredients were heated to 150° C. in 10 minutes and then held at 150° C. for 30 minutes or longer. As the reaction proceeded the acid number decreased and the color of the resinous products changed from water-white to yellow. The maturing of the resin is shown by the fact that the curing time on a hot plate at 200° C. decreased from 25 seconds to 2 seconds necessary to obtain gelatinization. This is shown by the following table:

Table II

CHANGE IN ACID NUMBER AND CURE OF A RESIN FORMED FROM ONE MOL BENZOYL BENZOIC ACID AND ONE MOL UREA

| Time at 150° C.* | Acid number | Cure† 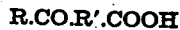 | Color of product |
|---|---|---|---|
| | | Seconds | |
| 0 minutes | 164 | 25 | Water-white. |
| 5 minutes | 160 | 14 | Do. |
| 10 minutes | 145 | 12 | Do. |
| 15 minutes | 132 | 9 | Pale yellow. |
| 20 minutes | 115 | 8 | Yellow. |
| 25 minutes | 98 | 5 | Do. |
| 30 minutes | 88 | 2 | Do. |

*10 minutes were required to fuse the materials and obtain 150° C.
†Hot plate temperature 200° C.

When means are used to protect the colors which are known to the art, a much lighter colored product is obtained.

EXAMPLE II

To one mol of benzoyl benzoic acid, two mols of isobutylamine are added. An exothermic reaction takes place which warms the mixture of ingredients to approximately 70° C. These ingredients are allowed to react from their own heat for a period of 10–30 minutes and then when the reaction has run its course, the reaction may be carried further by supplying heat to the reaction mixture. The heating is best done at about 150° C. using a reflux condenser to prevent the escape of isobutylamine. When the refluxing has proceeded far enough so that there is no odor of isobutylamine the condenser may be removed and heating discontinued. This process forms a pale straw colored resin. This material was soluble, while hot, in mineral spirits about one volume to one volume, but when it cooled the resin precipitated from solution. When this material was thinned with butanol, it formed a very stable solution which blended with practically all of the commercial types of alkyd resins even if they were already cut 50% in mineral spirits.

This family of resins made from ketonic acids and amines may be modified by other ingredients to vary the properties in much the same way that alkyd resins made from polybasic acids and polyhydric alcohols have been modified with the fatty acids, resinous acids and phenolic condensation products. It will be understood that many such modifications of this family of resins may be made to form new products with new and still further useful properties. It is to be understood that such modifications also come under the scope of this invention.

On the other hand, if one should use "Ketacine" resins to modify other resinous products, these uses of the "Ketacine" resins are to be considered as applications of this invention and also included by it. As an example for a use of our invention to modify other resinous products the following is cited as illustrative:

The resin made from benzoyl benzoic acid and isobutylamine as shown in Example II is used in combination with the urea-formaldehyde condensation process. 200 parts of the resin prepared as in Example II, and 62 parts of formaldehyde (commercial solution 37–40%), and 30 parts of urea are reacted together. First the formaldehyde is added to the resin made from benzoyl benzoic acid and isobutylamine and a cloudy white precipitation occurs during the initial stages of reaction, but this soon clears up between 50–60° C. When the formaldehyde is added the temperature rises from room temperature to 50–70° C. Upon adding 30 parts of urea the solution became somewhat cloudy and viscous, but it becomes clear upon gradually increasing the temperature to 95° C. and holding at this temperature. The material becomes more and more viscous and continues to remain clear. When the desired viscosity is obtained the material may be thinned with butanol to a 60% solution. This clear straw colored viscous solution in butanol is miscible with all types of commercial alkyd resin solutions such as the oil or oil acid modified types of polybasic acid-polyhydric resins in solution form, using hydrocarbon solvents either of the aromatic or aliphatic types. The product is soluble in butanol, xylol or toluol to practically any proportion and soluble to approximately equal parts by volume in mineral spirits. This modified urea-formaldehyde condensation product bakes out to a clear and hard film either by itself or in combination with the oil or oil acid modified alkyd resins showing complete compatibility of the resin even in the baked film where the solvents have had a chance to evaporate.

EXAMPLE III

One mol of pyruvic acid (88 parts by weight) were fused with 1 mol of urea (60 parts by weight) for 3 minutes at 100° C. The reaction was fast and the product had to be chilled to prevent gelation occurring, but no foaming took place. The light yellow-orange resin resulting had a softening point of 25–35° C. and converted to the infusible state very rapidly when heated 8 seconds on a hot plate at 200° C. It was completely soluble in water without heating, slightly soluble in alcohol, and insoluble in acetone, toluol, and in mineral spirits, and was soluble in alcohol upon heating. On account of its toughness and adhesion to glass and very fast curing properties together with solubility in water, it is apparent that this resin has special value in water soluble adhesives or in combination with various glue solutions for use in furniture glues, plywood glues, laminated material and the like.

EXAMPLE IV

One mol of pyruvic acid (88 parts by weight) were allowed to react with 1 mol (73 parts by weight) of isobutylamine. The reaction was very noticeably exothermic. It was not necessary to suply heat during the early stages of the reaction. The temperature rose to approximately 90° C. and was held at that temperature for 13 minutes, a very dark red, sticky balsam resulting, which converted to the infusible state on the hot plate in 9–10 seconds at 200° C. It was only slightly soluble in water, soluble in alcohol, slightly soluble in acetone and in toluol, but insoluble in mineral spirits. This product is particularly useful as a resin plasticizer for spirit varnishes, shellac, and other natural alcohol-soluble resins which in themselves are too brittle.

EXAMPLE V

One mol of pyruvic acid (88 parts by weight) was heated with 1 mol of diethylene triamine (120 parts by weight). Reaction took place without foaming as the temperature was gradually advanced up to 210° C. within 40 minutes. The color developed from yellow at 180° C. to dark brown when held 40 minutes at 260° C. The final product had a hot plate cure of 12 seconds at 200° C., and was soluble in water, denatured alcohol, acetone and toluene, but was insoluble in mineral spirits. The resulting balsam is of value as a resin plasticizer for many types of surface coatings.

EXAMPLE VI

One mol of laevulinic acid (116 parts by weight) were fused with one mol of urea (60 parts by weight) for 30 minutes at 115–155° C. No foam took place to any dangerous extent during the reaction. The resulting clear, bright, transparent orange colored resin had a softening range of 35–40° C. and was a hard, tough resin, having good adhesion to glass and converted to the infusible state by heating for 18 seconds at 200° C. in thin films. It was soluble in water, denatured alcohol, and insoluble in acetone, mineral spirits, and in toluol. This resin is useful in spirit varnishes, and for toughening shellac and other alcohol soluble natural resins.

EXAMPLE VII

One mol of laevulinic acid (116 parts by weight) were fused for 25 minutes at 155–200° C. with 1 mol (73 parts by weight) of isobutyl amine, a red, viscous balsam resulting, which had a 55 second cure on a 200° C. hot plate and possessed insolubility in water and in mineral spirit, but complete solubility in alcohol, acetone, and in toluol. This resin is of value as a resin plasticizer for a good many of the commonly used materials in the coating and the plastic industries on account of its solubility in the commonly used solvents, its stickiness, its high viscosity which works against loss of plasticizer by migration, and on account of its freedom from evaporation, as most chemical plasticizers are much more volatile than desired.

EXAMPLE VIII

One mol of laevulinic acid (116 parts by weight) were fused for 30 minutes at 154–161° C. with 1 mol of diethylene triamine (120 parts by weight). The reaction was not violent, showing no uncontrollable foaming, and it was necessary to supply heat to keep the resin-forming reaction going. At the end of 30 minutes of heating the color of the resinous balsam had changed from red to a very dark red so that, upon looking through about one-half inch of this material, it appeared beautifully transparent and blood colored. The resinous balsam was a very viscous liquid resin at room temperature of about the consistency of a very slow flowing tar, but converted to the infusible state on a 200° C. hot plate in 8 seconds, and was soluble in water, alcohol, and acetone and slightly soluble in toluol and mineral spirits. On account of its high viscosity, quick thermo-setting properties, and low penetration in the paper, and other properties which will be recognized by those skilled in the art, it is apparent that this resin, as made in this example, has value in the printing ink industry as a very fast drying ink ingredient.

Note.—The product in Example III is very clearly different from that which is described by Grimaux, Annales de Chemie et de Physique, 5th Series, vol. 11, pages 373–389 (1877), who merely mentions an amorphous white powder which is insoluble in alkalis. Our product of reaction of pyruvic acid and urea obtained by fusion results in a very fast curing, water-soluble resin. Grimaux does not even describe his product as a resin. He did not recognize it as a resin and knew nothing of the value of the product. Our product is clearly differentiated from Grimaux's in that it is a resin which may be easily recognized as such, and in addition it is heat convertible. All of the other examples, of course, are clearly not to be confused with Grimaux's or any of the other disclosures in the literature, particularly, the examples which contain isobutyl amine, it never before having been thought possible to form resins from a mono-amine as a principal reacting ingredient.

The following tabulation based on Examples III to VIII will give further information regarding the process and the resulting products:

| Exp. No. | Ketonic acid | Grams | Amine | Grams | Temp., °C., time | Foaming | Color | Softening point, °C. | Hot plate cure (sec.) 200° C. | Solubility | | | | | Visc. in alcohol (60% solution) | |
|---|---|---|---|---|---|---|---|---|---|---|---|---|---|---|---|---|
| | | | | | | | | | | Water | Alc. | Acetone | M. S. | Toluol | Visc. | Color HK |
| T-761-A | Pyruvic | 22 | Urea | 15 | 100° C. 3' | No | Orange | 25–30 | 8" | S | SlS | I | I | I | BC | Cloudy |
| -B | Pyruvic | 22 | IBA* | 18 | 90° C. 13' | Very reactive without heat | Dark red | ------ | 9¾" | SlS | S | SlS | I | SlS | <A | >9 |
| -C | Pyruvic | 22 | Diethylene-triamine, mol | 30 | 100–195 7' / 180 10' / 210 30' / 260 40' | No | Black yellow | ------ | 12 | S | S | S | I | S | <A | >9 |
| -D | Laevulinic | 29 | Urea | 15 | 115–155 30' | No | Orange | 35–40 | 18" | S | S | I | I | I | <A | 6–7 |
| -E | Laevulinic | 29 | IBA* | 18 | 154–200 25' | No | Red | ------ | 55¼" soft cure | I | S | S | I | S | <A | 7–8 |
| -F | Laevulinic | 29 | Diethylene-triamine | 30 | Boils 154° 161° C. 25' | No | Red (dark) | ------ | 8" | S | S | S | SlS | SlS | AB | >9 |

* Isobutylamine.

Note: S, soluble; SlS, slightly soluble; I, insoluble; >, greater than; <, less than.
M. S. designates mineral spirits having a boiling range of 300°–400° F. and a Kauri butanol value of 36.

Products made along orthodox varnish and lacquer technology with resins of the "Ketacine" family are to be considered as applications of this resin family and to be covered by the scope of this invention. It is to be further understood that certain catalysts may be used to promote further resinification of these ingredients or to accomplish this purpose in a shorter time. In some cases where resins form with difficulty we have found it especially helpful to introduce such a catalyst. An instance of this is in the case of isobutylamine and pyruvic acid, in which the resinification may be speeded up materially by the use of a catalyst although such catalyst is not essential. We anticipate that any process which undertakes the simultaneous reduction of a nitro compound to an amine and at the same time resinifying the resulting amine with a ketonic acid to be within the scope of our invention. For example, we have shown that aniline, the reduction product of nitrobenzene can form a resin with ketonic acid.

In surface coatings such as lacquers and varnishes these resins, on account of their adhesive properties, increase the value of surface coatings, especially lacquers, where they increase adhesion, toughness and hardness of the resulting product. The usefulness of these products is not limited to surface coating materials as it extends into plastic moulding compounds as well and particularly into rubber since they reduce the porosity of rubber and increase the adhesion and tend to act as antioxidants and, in the case of the thiourea "Ketacine" resins, they tend to act as vulcanization accelerators as well. Many of these resinous products are characterized by extremely light color and color retention.

The Ketacine resins are thermo-setting and heat convertible, and, particularly in the case of those manufactured from aliphatic ketonic acids such as pyruvic and laevulinic acids, are useful as components of adhesives, cementing compositions and surface coatings generally.

By the term "ketonic acid" as used in the present specification and claims we have reference to organic acids derived from ketones, such acids being aliphatic, aromatic or having mixed aliphatic and aromatic radicals.

By the term "amine" as used in the present specification and claims we have reference to that class of strongly basic substances derived from ammonia by replacement of hydrogen by one or more univalent hydrocarbon radicals.

We claim:

1. An artificial heat-setting resin obtained by fusing an organic amine and laevulinic acid.

2. A process of forming an artificial heat-setting resin which comprises fusing together an organic amine and laevulinic acid, said acid and said amine constituting the principal reacting ingredients.

3. An artificial heat-setting resin formed by fusing together an organic mono-amine and laevulinic acid.

4. An artificial heat-setting resin formed by fusing together an organic polyamine and laevulinic acid.

ALMON G. HOVEY.
THEODORE S. HODGINS.